United States Patent
Giffard-Burley

(10) Patent No.: US 11,093,585 B2
(45) Date of Patent: Aug. 17, 2021

(54) LICENSE AND AUTHENTICATION MANAGEMENT SERVER

(71) Applicant: Wacom Co., Ltd., Kazo (JP)

(72) Inventor: Joss Giffard-Burley, Frome (GB)

(73) Assignee: Wacom Co., Ltd., Kazo (JP)

(*) Notice: Subject to any disclaimer, the term of this patent is extended or adjusted under 35 U.S.C. 154(b) by 239 days.

(21) Appl. No.: 16/000,549

(22) Filed: Jun. 5, 2018

(65) Prior Publication Data

US 2019/0065704 A1 Feb. 28, 2019

Related U.S. Application Data

(60) Provisional application No. 62/552,931, filed on Aug. 31, 2017.

(51) Int. Cl.
*H04L 9/32* (2006.01)
*H04L 29/06* (2006.01)
(Continued)

(52) U.S. Cl.
CPC ............ *G06F 21/105* (2013.01); *G06F 21/31* (2013.01); *H04L 9/321* (2013.01); *H04L 9/3247* (2013.01); *H04L 9/3263* (2013.01); *H04L 63/0823* (2013.01); *H04L 63/0815* (2013.01); *H04L 63/10* (2013.01); *H04L 63/102* (2013.01)

(58) Field of Classification Search
CPC ..... H04L 9/3263; H04L 9/3247; H04L 9/321; H04L 63/0823; H04L 63/102; H04L 63/0815; H04L 63/10; G06F 21/105
See application file for complete search history.

(56) References Cited

U.S. PATENT DOCUMENTS 8,260,715 B2 * 9/2012 Bhogal ................. G06Q 10/10
705/59
2002/0107809 A1 8/2002 Biddle et al.
(Continued)

OTHER PUBLICATIONS

Dykstra, T., et al., "Authentication and Authorization for API Apps in Azure App Service," Microsoft, May 23, 2016, <https://docs.microsoft.com/en-us/azure/app-service-api/app-service-api-authentication> [retrieved Mar. 2, 2017], 6 pages.
(Continued)

*Primary Examiner* — Alexander Lagor
*Assistant Examiner* — Vu V Tran
(74) *Attorney, Agent, or Firm* — Christensen O'Connor Johnson Kindness PLLC

(57) ABSTRACT

A client computing device accesses license and authentication management services provided by a license and authentication management server, which communicates with an authentication server and an application server. The client computing device authenticates a user and validates a license for a client application (e.g., a signature application) executing on the client computing device. The license and authentication management server provides an authentication API configured to manage communications between the client application and an authentication server to authenticate a user of the client application. The license and authentication management server also provides a subscription API configured to manage communications between the client application and an application server to validate a license associated with the client application.

20 Claims, 6 Drawing Sheets

(51) Int. Cl.
    *G06F 21/10*        (2013.01)
    *G06F 21/31*        (2013.01)

(56) References Cited

U.S. PATENT DOCUMENTS

| | | | | |
|---|---|---|---|---|
| 2004/0145758 | A1* | 7/2004 | Lamy | G01J 3/52 |
| | | | | 358/1.9 |
| 2009/0235349 | A1* | 9/2009 | Lai | H04L 9/3236 |
| | | | | 726/14 |
| 2011/0289003 | A1* | 11/2011 | Womack | G06F 21/105 |
| | | | | 705/59 |
| 2013/0110675 | A1 | 5/2013 | Bouw | |
| 2013/0227119 | A1* | 8/2013 | Simen | H04L 67/24 |
| | | | | 709/224 |
| 2016/0117548 | A1* | 4/2016 | Hirakawa | G06F 3/04883 |
| | | | | 382/187 |
| 2017/0041296 | A1* | 2/2017 | Ford | H04W 12/06 |
| 2018/0083835 | A1* | 3/2018 | Cole | H04L 41/12 |
| 2019/0347888 | A1* | 11/2019 | Agbeyo | G06K 7/10297 |

OTHER PUBLICATIONS

Hardt, D. (Ed.), "The OAuth 2.0 Authorization Framework," Internet Engineering Task Force (IETF), Microsoft, Oct. 2012, 76 pages.

\* cited by examiner

LICENSE AND AUTHENTICATION MANAGEMENT SERVER

CROSS-REFERENCE TO RELATED APPLICATION

This application claims the benefit of Provisional Application No. 62/552,931, filed Aug. 31, 2017, which is expressly incorporated herein by reference in its entirety.

BACKGROUND

Today, it is common for software to be provided as an ongoing license, which requires regular validation of the license. In one scenario, a client application executing on a client computing device provides the licensed functionality. In another scenario, a client device accesses a web application (e.g., via a web browser) hosted on a server, which provides the licensed functionality. The user of the client device identifies herself to the web application, such as with a user ID and password, in order to use the application.

These arrangements pose a significant technical challenge for developers of client applications and web applications. In addition to providing the licensed functionality, these applications typically must include specialized code to communicate with a back-end server that stores license information, in order to determine if the user's license is valid. If authentication of a particular user is required, these applications also include specialized code to communicate with a back-end server that stores user identity information, in order to determine whether the user can be authenticated.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a server computer system provides license and authentication management services. The server computer system comprises one or more processors, a network interface, and computer-readable media comprising an authentication API configured to manage communications between a client application (e.g., a signature application or other electronic handwriting application) executing on a client computing device and an authentication server to authenticate a user of the client application, a subscription API configured to manage communications between the client application and an application server to validate a license associated with the client application. The server computer system is programmed to receive an authentication request from the client application via the authentication API; transmit the authentication request to the authentication server via the authentication API; receive an authentication response (e.g., a SAML (Security Assertion Markup Language) assertion) from the authentication server via the authentication API in response to the authentication request; transmit a unique user ID to the client application via the authentication API, wherein the unique user ID (e.g., a base-64 encoded version of the SAML assertion) is derived from the authentication response; receive a license validation request via the subscription API from the client application; transmit the license validation request to the application server via the subscription API; receive a license validation response from the application server via the subscription API, wherein the license validation response includes subscription data (e.g., a subscription status); and transmit the subscription data to the client application via the subscription API. For electronic handwriting applications, the license may include a digital ink license.

In another aspect, a client computing device transmits an authentication request to a license and authentication management server via an authentication API provided by the license and authentication management server; receives a unique user ID from the license and authentication management server via the authentication API; transmits a license validation request to the license and authentication management server via a subscription API provided by the license and authentication management server; and receives subscription data from the license and authentication management server via the subscription API. The unique user ID is derived from an authentication response provided by the authentication server to the license and authentication management server in response to the authentication request. The subscription data is derived from a license validation response provided by the application server to the license and authentication management server in response to the license validation request.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
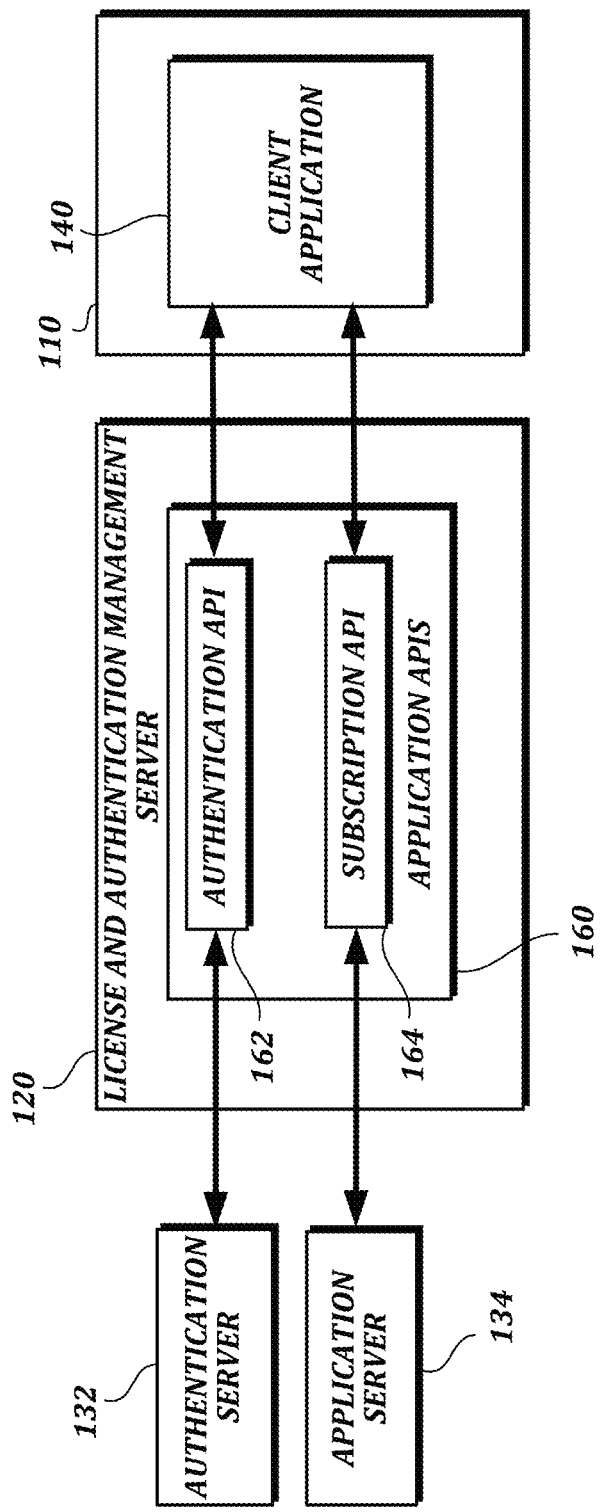
FIG. 1A is a block diagram of a computer system including a license and authentication management server according to a first illustrative embodiment.

In embodiments described herein, a client computing device (such as a desktop computer, notebook computer, or any other suitable computing device) accesses license and authentication management services provided by a license and authentication management server, which communicates with an authentication server and an application server. The client computing device authenticates a user and validates a license for a client application executing on the client computing device. The license and authentication management server provides one or more APIs to manage communications between the client application and other servers, such as APIs that use a Representational State Transfer (REST) architecture. In described examples, the license and authentication management server provides an authentication API configured to manage communications between the client application and an authentication server to authenticate a user of the client application. The license and authentication management server also provides a subscription API configured to manage communications between the client application and an application server to validate a license associated with the client application.

The license and authentication management server acts as an intermediary between the client application, one or more authentication servers (e.g., a server of a single-sign-on (SSO) identity provider (IdP), such as OneLogin, Inc., or Gigya, Inc.), and one or more application servers (e.g., a server of an application marketplace provider such as App-Direct, Inc.) that store license information. The license and authentication management server permits the client application to be programmed in a more lightweight fashion, omitting specialized code for communicating directly with the authentication servers and the application servers. In practice, this arrangement not only allows a provider of the license and authentication management server to more easily provide a wide variety of client applications, but also allows third party software vendors to more easily provide their own client applications that rely on the license and authentication management server for these purposes. In addition, this arrangement is useful for "offline/online" client applications, which do not necessarily require an uninterrupted internet connection to function, unlike web applications. The offline/online client application can check for a valid license by sending appropriate requests to the license and authentication management server and receiving responses when the application is online.

First Illustrative Embodiment

In this section, a first illustrative embodiment is described in which a client computing device (such as a desktop computer, notebook computer, or any other suitable computing device) accesses license and authentication management services provided by a license and authentication management server, which communicates with an authentication server and an application server. The client computing device authenticates a user and validates a license for a client application executing on the client computing device.

FIG. 1A is a block diagram of a system according to the first illustrative embodiment. In the example shown in FIG. 1A, a client computing device 110 communicates with a license and authentication management server 120 over a network, such as the Internet. The client computing device 110 executes a client application 140, which communicates with the license and authentication management server 120 via application APIs 160 provided by the license and authentication management server 120. In particular, the client application 140 communicates with an authentication API 162 for authentication purposes and a subscription API 164 for subscription or license validation purposes.

The license and authentication management server 120 can provide these services in many different ways. In one illustrative scenario, a user inputs user data (e.g., an account ID) at the client computing device 110 to log in to a service associated with the client application 140. The client computing device 110 transmits an authentication request to the license and authentication management server 120 via the authentication API, which, in turn, redirects the authentication request to the authentication server 132. The authentication server 132 checks that the authentication request is associated with a known user. For example, the authentication server 132 may look up an account ID in a database to determine whether the account ID is valid. Upon authenticating that the user is a valid user of the client application, the authentication server 132 then returns a unique user ID (UUID) to the license and authentication management server 120. This UUID (or a version of it) is then transmitted to the client computing device 110, thereby completing the authentication of the user of the client application 140.

For license validation, the client computing device 110 transmits a license validation request (which may include, e.g., device and application data such as a machine ID and a product ID) to the license and authentication management server 120 via the subscription API, which, in turn, redirects the license validation request to the application server 134. The application server 134 may require separate entries for various applications that it supports. If so, the application server 134 may check for a corresponding entry for the client application. If the client application is supported, the application server 134 checks that the particular license of the client application 140 is valid based on the data received from the license and authentication management server 120. For example, the application server 134 may look up a machine ID and product ID in a license database to determine whether a valid license exists for that application and device. The product ID may have been automatically generated by the application server 134 (e.g., as part of a process for making the client application available for download or purchase on the application server). Alternatively, the product ID may be determined in some other way.

In response to the license validation request, the application server 134 returns subscription data (e.g., a license status) to the license and authentication management server 120. This subscription data (or a version of it) is then transmitted to the client computing device 110, thereby completing the validation of the license of the client application 140.

Figure 3:
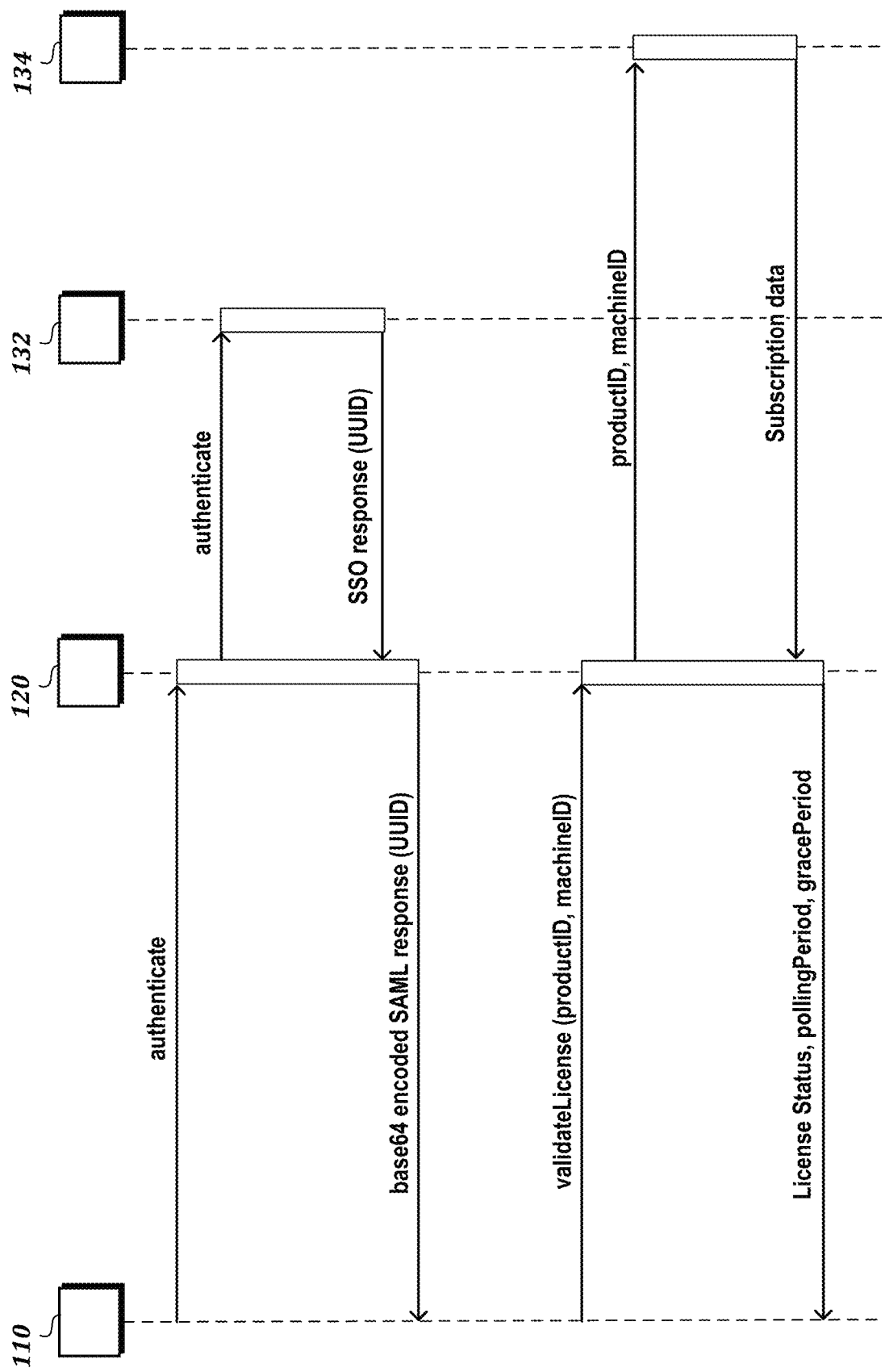
FIG. 3 is an interaction diagram of an illustrative series of interactions between a client computing device, a license and authentication management server, an authentication server, and an application server of the embodiment of FIG. 1A or other embodiments described herein.

FIG. 3 is an interaction diagram of an illustrative series of interactions between the client computing device 110, the license and authentication management server 120, the authentication server 132, and the application server 134 of the embodiment of FIG. 1A or other embodiments described herein. In the example shown in FIG. 3, the client computing device 110 initiates authentication by sending an authentication request to the license and authentication management server 120, which redirects it to the authentication server 132. The authentication server 132 then attempts to authenticate the user. If the authentication is successful, the authentication server 132 returns a UUID to the license and authentication management server 120. In this example, the UUID is provided by the authentication server as a SAML (Security Assertion Markup Language) assertion, and the license and authentication management server 120 provides it to the client computing device 110 as a base-64 encoded SAML assertion. This assertion may then be provided as part of a license validation request which, in this example, includes a product ID for the client application and a machine ID for the client computing device 110. The client computing device 110 provides this information to the license and authentication management server 120, which redirects it to the application server 134. The application server 134 then attempts to validate the license. If the license is valid, the application server 134 returns subscription data (e.g., license status, polling period, grace period) to the license and authentication management server 120, which provides it to the client computing device 110.

Features of an illustrative authentication API will now be described. In at least one embodiment, the authentication API includes a "createSessionToken" operation, which creates a session token. This operation is invoked with an HTTP GET request and returns a login URL, a logout URL, a token ID, and an expiration time. These items may be returned as JSON (JavaScript Object Notation) text, in the format described below.

```
{
    "LoginURL": "string",
    "LogoutURL": "string",
    "TokenID": "string",
    "Expiry": "2017-08-28T23:03:38.811Z"
}
```

An application that invokes createSessionToken may provide an interface that instructs a user to log in with their account ID using the supplied login URL in a browser. Alternatively, the createSessionToken operation can be designed to operate in a different way or return a different combinations of items. The application can poll a queryToken endpoint on the license and authentication management server 120 with the token ID, as needed, for details about the current login state of the user.

When the user login is completed, the UUID (e.g., a SAML assertion) can be obtained. In at least one embodiment, the authentication API includes an "authenticate" operation, which returns a SAML assertion. This operation is invoked with an HTTP GET request and returns the UUID. The UUID may be provided in the form of a base-64 encoded SAML assertion in JSON text, such as in the format described below.

```
{
    "EncodedSAML": "string"
}
```

Prior to base-64 encoding, the SAML assertion may be provided in XML form, similar to the following example.

```
<samlp:Response xmlns:saml="urn:oasis:names:tc:SAML:2.0:assertion"
xmlns:samlp="urn:oasis:names:tc:SAML:2.0:protocol"
ID="R6df1f16c0bce35bcab3afb11e2563895673bb83c" Version="2.0"
IssueInstant="2016-02-22T15:45:44Z"
Destination="https://example.net/"
InResponseTo="_ffa46f3a-5af6-4f25-90af-c6b478b45522">
<saml:Issuer>https://example.com/saml/metadata/518337</saml:Issuer>
<samlp:Status>
<samlp:StatusCode Value="urn:oasis:names:tc:SAML:2.0:status:Success"/>
</samlp:Status>
<saml:Assertion xmlns:saml="urn:oasis:names:tc:SAML:2.0:assertion"
xmlns:xs="http://www.w3.org/2001/XMLSchema"
xmlns:xsi="http://www.w3.org/2001/XMLSchema-instance" Version="2.0"
ID="pfx8b690e86-ea44-2c92-41c6-c9347e7e96b3"
IssueInstant="2016-02-22T15:45:44Z">
<saml:Issuer>https://example.com/saml/metadata/518337</saml:Issuer>
<ds:Signature xmlns:ds="http://www.w3.org/2000/09/xmldsig#">
<ds:SignedInfo>
<ds:CanonicalizationMethod
Algorithm="http://www.w3.org/2001/10/xml-exc-c14n#"/>
<ds:SignatureMethod
Algorithm="http://www.w3.org/2000/09/xmldsig#rsa-sha1"/>
<ds:Reference URI="#pfx8b690e86-ea44-2c92-41c6-c9347e7e96b3">
<ds:Transforms>
<ds:Transform
Algorithm="http://www.w3.org/2000/09/xmldsig#enveloped-signature"/>
<ds:Transform
Algorithm="http://www.w3.org/2001/10/xml-exc-c14n#"/>
</ds:Transforms>
<ds:DigestMethod
Algorithm="http://www.w3.org/2000/09/xmldsig#sha1"/>
<ds:DigestValue>IiQCc85sAVW1Y038X6Ws1gmAgRE=</ds:DigestValue>
</ds:Reference>
</ds:SignedInfo>
<ds:SignatureValue> ... </ds:SignatureValue>
<ds:KeyInfo>
<ds:X509Data>
<ds:X509Certificate> ... </ds:X509Certificate>
</ds:X509Data>
</ds:KeyInfo>
</ds:Signature>
<saml:Subject> ... </saml:Subject>
<saml:Conditions ...> ... </saml:Conditions>
<saml:AuthnStatement ...> ... </saml:AuthnStatement>
<saml:AttributeStatement> ... </saml:AttributeStatement>
</saml:Assertion>
</samlp:Response>
```

If the authenticate operation is invoked when the user is not presently logged in, such that the SAML assertion cannot be obtained, the operation may redirect the user to a login URL. Alternatively, the authenticate operation can be designed to operate in a different way. An "unauthenticate" operation also may be provided (e.g., to cause a current token ID to be invalidated when a user logs out).

Features of an illustrative subscription API will now be described. In at least one embodiment, the subscription API includes a "validateLicense" operation, which obtains current license information in the form of a license status (e.g., an integer indicating that the license is invalid, valid, already in use, or not found). This operation is invoked with an HTTP POST request that includes a product ID and a machine ID as parameters, as well as the SAML assertion in the post body, and returns a license status. The license status may be accompanied by other information, such as a polling period (how often the client should communicate with the server to check the license information and confirm it is valid), a grace period (time to remain operational and allow offline usage beyond the polling period if unable to contact the server during the polling period), a server system time stamp (which may be used to detect manipulation of clock at client side to extend subscription), an edition code for the subscription, or some combination of these items or other items. The validateLicense operation may return JSON text, such as in the format described below:

```
{
    "licenseStatus": [integer],
    "pollingPeriod": [integer] (e.g., a number of minutes, such as
        1440 (24 hours),
    "graceTime": [integer] (e.g., a number of hours, such as 24),
    "systemTime": [integer],
    "editionCode": "string"
}
```

The license status may be represented as follows:
0=invalid (user exists in database but has no active license);
1=valid (user exists in database and an active license has been found);
2=already in use (license is already being used on another machine);
3=not found (user cannot be found in database).
Alternatively, the validateLicense operation can be designed to operate in a different way or return a different combination of items.

If the license status is not valid, other items such as polling period and grace period may be set to 0 or some other default value. The grace period can be reset each time the client successfully confirms the license during the polling period.

In at least one embodiment, the subscription API also includes an "authorizeLicense" operation that can be invoked if the license is already in use and the user decides to continue with installation on a different device. Similar to the the validateLicense operation described above, this operation may be invoked with an HTTP POST request that includes a product ID and a machine ID, as well as the SAML assertion in the post body, and returns a license status that may be accompanied by other information such as a polling period, a grace period, a server system time stamp, an edition code for the subscription, or some combination of these items or other items. The authorizeLicense operation causes other stored machine IDs to be flagged as deauthorized. Alternatively, the authorizeLicense operation can be designed to operate in a different way.

The embodiments described herein are not limited to the specific API designs described herein. Although certain operations are described as being provided by an authentication API or a subscription API for purposes of illustration, it should be understood that these operations (or other operations) may be provided in a single, combined API or distributed across more than two APIs. Furthermore, the APIs described in these examples are not limited to the specific combinations of illustrative operations described above. In alternative embodiments, fewer operations, more operations, or alternative operations may be provided.

For example, a subscription API or other API provided by a license and authentication management server may include operations for obtaining additional details about licenses or client applications. In at least one embodiment, the subscription API includes a "versionDetails" operation that can be invoked with an HTTP POST request that includes a product ID for an application, as well as the SAML assertion in the post body, and returns information (e.g., in JSON text) such as a version number, release notes, a download URL, or a combination of these items or other items. Alternatively, the versionDetails operation can be designed to operate in a different way. The subscription API also may include a "subscriptionDetails" operation similar to the "versionDetails" operation, except that additional details relating to the subscription may be returned, such as a subscription ID, a subscription start date, a subscription end date, additional status details (e.g., indicating whether the subscription is paid up, suspended, canceled, or provided as a free trial), or a combination of these items or other items. Alternatively, such details may be provided by other versions of operations described herein, such as the validateLicense operation described above.

Second Illustrative Embodiment

In this section, a second illustrative embodiment is described in which the license and authentication management server 120 includes additional APIs for communicating with the authentication server 132 and the application server 134. The second illustrative embodiment also includes additional details relating to operation of and communication with the application server 134 in an application marketplace scenario that facilitates provision of client applications by third parties. As in the first illustrative embodiment, the client computing device authenticates a user and validates a license for a client application executing on the client computing device.

Figure 1B:
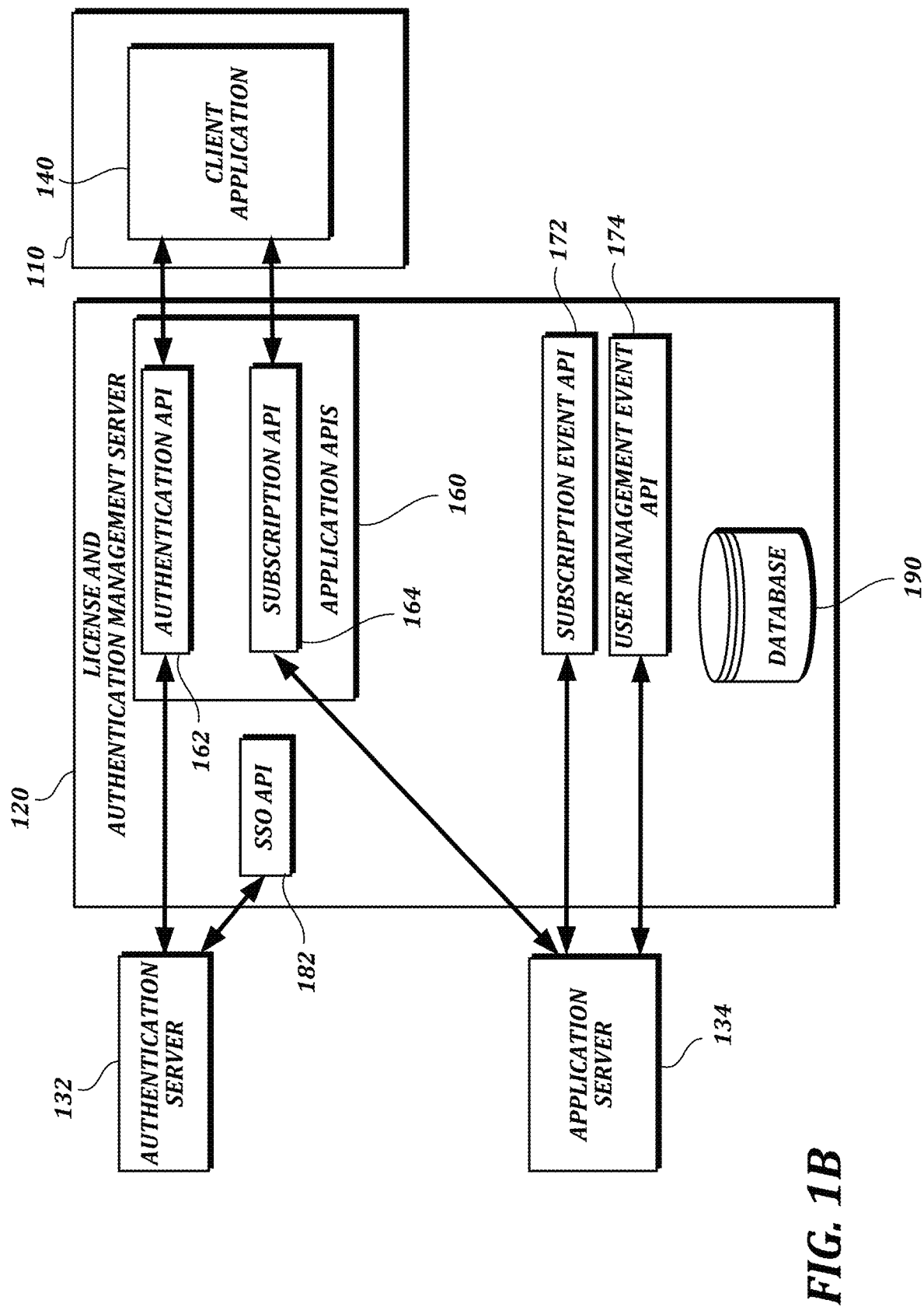
FIG. 1B is a block diagram of a computer system including a license and authentication management server according to a second illustrative embodiment.

FIG. 1B is a block diagram of a system according to the second illustrative embodiment. As in FIG. 1A, the client computing device 110 executes a client application 140, which communicates with the license and authentication management server 120 via application APIs 160 provided by the license and authentication management server 120. In particular, the client application 140 communicates with an authentication API 162 for authentication purposes and a subscription API 164 for subscription or license validation purposes. In the example shown in FIG. 1B, the license and authentication management server 120 also includes an SSO API 182 to handle specific communications with the authentication server 132 relating to SSO functionality, as well as marketplace APIs such as a subscription event API 172 and a user management event API 174 to handle specific communications with the application server 134, relating subscription events (e.g., new or updated subscriptions) and user management events (e.g., adding new users), respectively. The license and authentication management server 120 also includes a database 190 that may be used to store entries for client applications, such as the illustrative entries described below.

An illustrative scenario is now described with reference to the second illustrative embodiment in which three main tasks are completed to add a new client application to the system. In the first task, the application server 134 creates a new marketplace entry and generates information for a client application. The marketplace entry may include a URL for downloading the client application, which is enabled for subscription-based licensing. The information generated by the application server 134 may include security information. In an application marketplace system that uses an OAuth standard for access delegation (e.g., the OAuth 2.0 framework published as RFC 6749 by the Internet Engineering Task Force (IETF)), the security information may include OAuth credentials, such as an OAuth key and an OAuth secret.

In the second task, the license and authentication management server 120 creates entries for the client application. The entries created by the license and authentication management server 120 may include a product ID (e.g., a name of the application, an ID generated by the application marketplace, or some other product ID) and security information, such as OAuth credentials, for the application. OAuth credentials may be used to sign API calls to and from the application server 134. The license and authentication management server 120 also may create additional entries to store additional information for the client application, such as a polling period, a grace period, version information, release notes, a download URL, IdP certificates, SAML assertions, SSO target URLs or other URLs associated with the authentication or subscription information, SAML issuer ID, or some combination of these items or other items. Such information can be stored in a text file, an XML file, or in some other way. For example, for a client application named "ClientApp" the entries may be stored in a format similar to the following, though other formats also may be used.

ClientApp="[product ID generated by application marketplace]"
ClientApp_oauth_key="[OAuth key]"
ClientApp_oauth_secret="[OAuth secret]"
ClientApp_polling_Period=[integer]
ClientApp_gracePeriod=[integer]

In the third task, the license and authentication management server 120 communicates with the client application 140 via the application APIs 160 to authenticate a user and retrieve subscription/license information, as described above. Once the user has been authenticated and the subscription/license information has been checked, the user can access functionality provided by the client application 140.

Third Illustrative Embodiment

In this section, a third illustrative embodiment is described in which the client computing device is communicatively coupled to an electronic handwriting capture device such as a signature device (e.g., a dedicated signature tablet or other device suitable for collecting electronic handwriting, such as signatures). As in the first illustrative embodiment, the client computing device accesses license and authentication management services provided by a license and authentication management server, which communicates with an authentication server and an application server.

Figure 2:
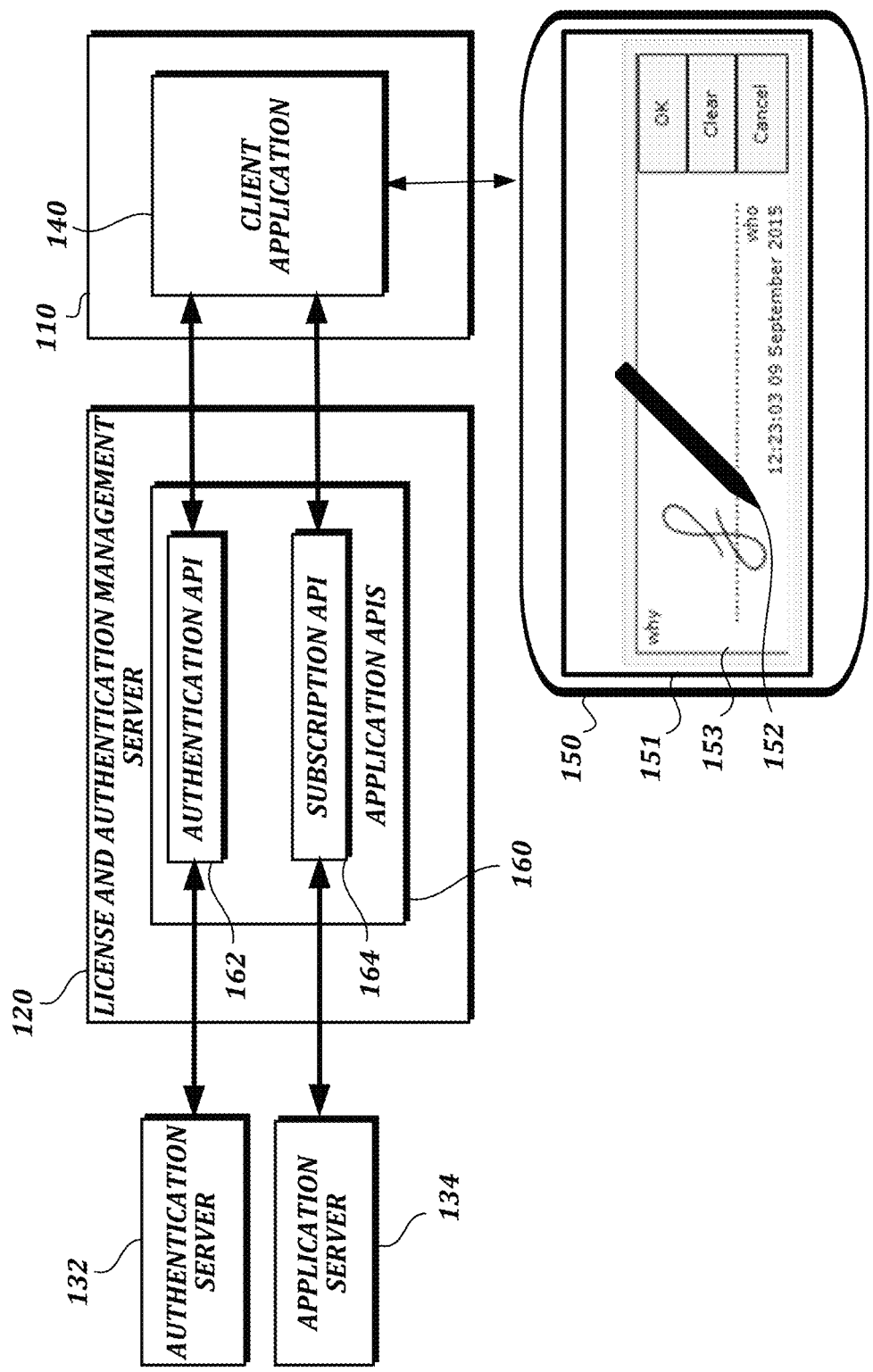
FIG. 2 is a block diagram of a computer system including a license and authentication management server according to a third illustrative embodiment.

FIG. 2 is a block diagram of a system according to the third illustrative embodiment. In the example shown in FIG. 2, as in the first illustrative embodiment, a client computing device 110 communicates with a license and authentication management server 120 over a network, such as the Internet. The client computing device 110 executes a client application 140, which communicates with the license and authentication management server 120 via application APIs 160 provided by the license and authentication management server 120. In particular, the client application 140 communicates with an authentication API 162 for authentication purposes and a subscription API 164 for subscription or license validation purposes. The authentication and license validation process can be carried out as described herein with respect to other embodiments.

In this embodiment, the client computing device authenticates a user and validates a license for a client application (e.g., sign pro PDF, available from Wacom Co., Ltd.) that can embed electronic handwriting data obtained from signature devices in electronic documents. As used herein, the term "signature devices" refers to devices that capture handwriting input for signatures. Signature devices may be implemented as dedicated signature collection devices or as general purpose devices, such as suitably configured smart phones or tablet computers. Signature devices are not necessarily strictly input devices, and may include other functionality (e.g., display functionality, data transmission functionality, etc.). Further details on illustrative signature devices are provided below.

In the example shown in FIG. 2, the client application 140 receives signature data (e.g., pen event data, such as coordinate data and pressure data, or signature data other than pen event data (e.g., an image of the signature, biometric data, etc.)) that corresponds to a signature from the signature device 150. The content of the signature data may depend on the configuration or capabilities of the signature device control software or the signature device itself. For example, signature data may include a digital image of the signature, pen event data, other signature data, or some combination of such data. In this example, the signature device 150 includes an LCD screen 151 that displays an electronic document (e.g., a contract), including a signature area 153 provided by the control module 144 on which a signature is being made with a pen device 152, and user interface elements (e.g., buttons labeled "OK," "Clear," and "Cancel") that can be used to confirm that a signature is complete, to clear a signature, to cancel a signature, etc. Signature data corresponding to the signature being made can be provided as input to the client application 140.

In general, signature devices may use electromagnetic resonance (EMR) technology, in which a digitizer incorporates a sensor board that detects the pen's movement and energy is induced in the pen's resonant circuit by a magnetic field generated by the sensor board surface. The pen's resonant circuit then makes use of this energy to return a magnetic signal to the sensor board surface. The board detects the pen's coordinate position at regular time intervals even if the electronic pen does not touch the sensor board surface, so long as the pen remains within close enough proximity to the sensor board, such that signals can still be received from the pen. (The effective signal range can vary depending on the particular technology being used, but is generally on the order of several millimeters.)

Alternatively, other handwriting input technology can be used. For example, an electronic pen may use other wireless technology or may be connected by a wire to a digitizer. As another example, an electronic pen may or may not be detectable away from the surface of a digitizer. As another example, an electronic pen may be powered or unpowered. Powered pens may receive power via a wire connected to an external power source or via an on-board battery. As another example, it is possible to input handwriting data without an electronic pen (e.g., via a stylus on a pressure sensitive digital writing pad, a touchscreen, or some other input device that does not require an electronic pen).

However the handwriting data may be collected, handwriting data provided by signature devices may include pen event information, device information, and/or contextual information about the context in which the handwriting was made. Pen event information may include the x/y position of the pen-tip on or above the digitizer surface and the time since the start of the handwriting. In addition to x/y-coordinate values, pen event information may optionally include additional information subject to the capabilities of the signature device, such as pressure (pen force), angles (azimuth, altitude, and/or rotation) and pen-down status. Pen event information is typically collected at regular intervals during a signing process.

Illustrative Processes

This section provides details of illustrative processes for authenticating users and obtaining subscription data for a client application (e.g., a signature application or other electronic handwriting application). The processes described in this section can be performed by a license and authentication management server of any of the embodiments described herein, or by some other suitably configured computer system.

Figure 4:
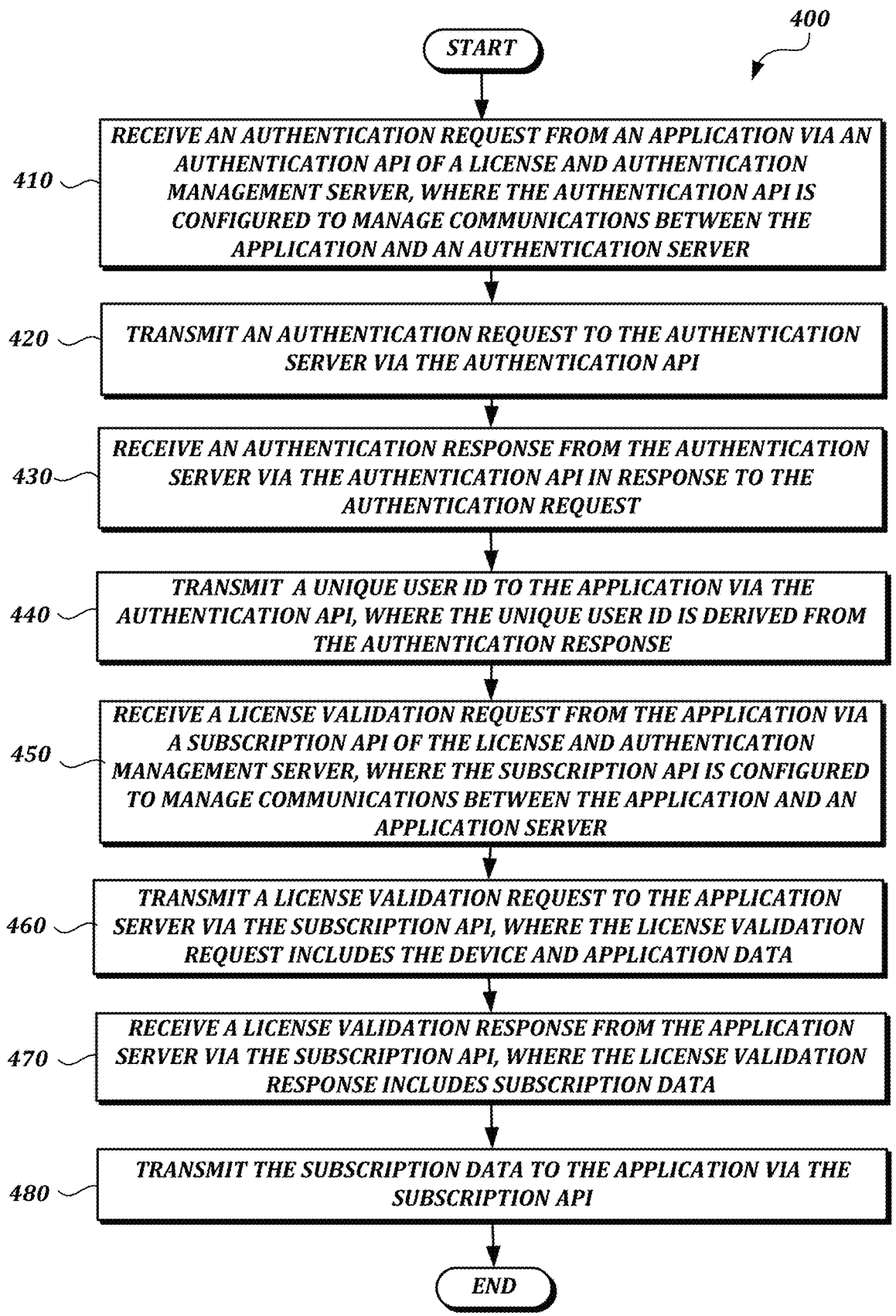
FIG. 4 is a flow diagram of an illustrative process in which a license and authentication management server authenticates a user and provides subscription data for an application executing on a client computing device using APIs provided by the license and authentication management server.

FIG. 4 is a flow diagram of an illustrative process 400 in which a computer system (e.g., the license and authentication management server 120 of FIG. 1B) authenticates a user and provides subscription data for an application executing on a client computing device (e.g., the client computing device 110 of FIG. 1B). At step 410, the license and authentication management server receives an authentication request from the client computing device via an authentication API of the license and authentication management server. The authentication API is configured to manage communication between the application and an authentication server (e.g., a server of an SSO identity provider). In an illustrative scenario, the authentication request is received via an HTTP GET request that invokes the illustrative "authenticate" operation described above. The authentication request is for a user that has previously logged in (e.g., using techniques described above with reference to the illustrative embodiments) to a system that provides subscription-based services via the application. At step 420, the license and authentication management server transmits the authentication request to the authentication server via the authentication API. At step 430, the license and authentication management server receives an authentication response (e.g., a SAML assertion) from the authentication server via the authentication API in response to the authentication request. At step 440, the license and authentication management server transmits a unique user ID to the application via the authentication API. The unique user ID is derived from the authentication response. For example, the UUID may be a base-64 encoded version of the SAML assertion received in the authentication response.

At step 450, the license and authentication management server receives a license validation request from the application via a subscription API of the license and authentication management server. The subscription API is configured to manage communications between the application and an application server. In an illustrative scenario, the license validation request is received via an HTTP POST request that invokes the illustrative "validateLicense" operation described above. The license validation request may include device and application data (e.g., a machine ID and a product ID). At step 460, the license and authentication management server transmits the license validation request to the application server via the subscription API. At step 470, the license and authentication management server receives a license validation response from the application server via the subscription API. The license validation response includes subscription data (e.g., a license status, a polling period, and a grace period). At step 480, the license and authentication management server transmits the subscription data to the application via the subscription API.

Figure 5:
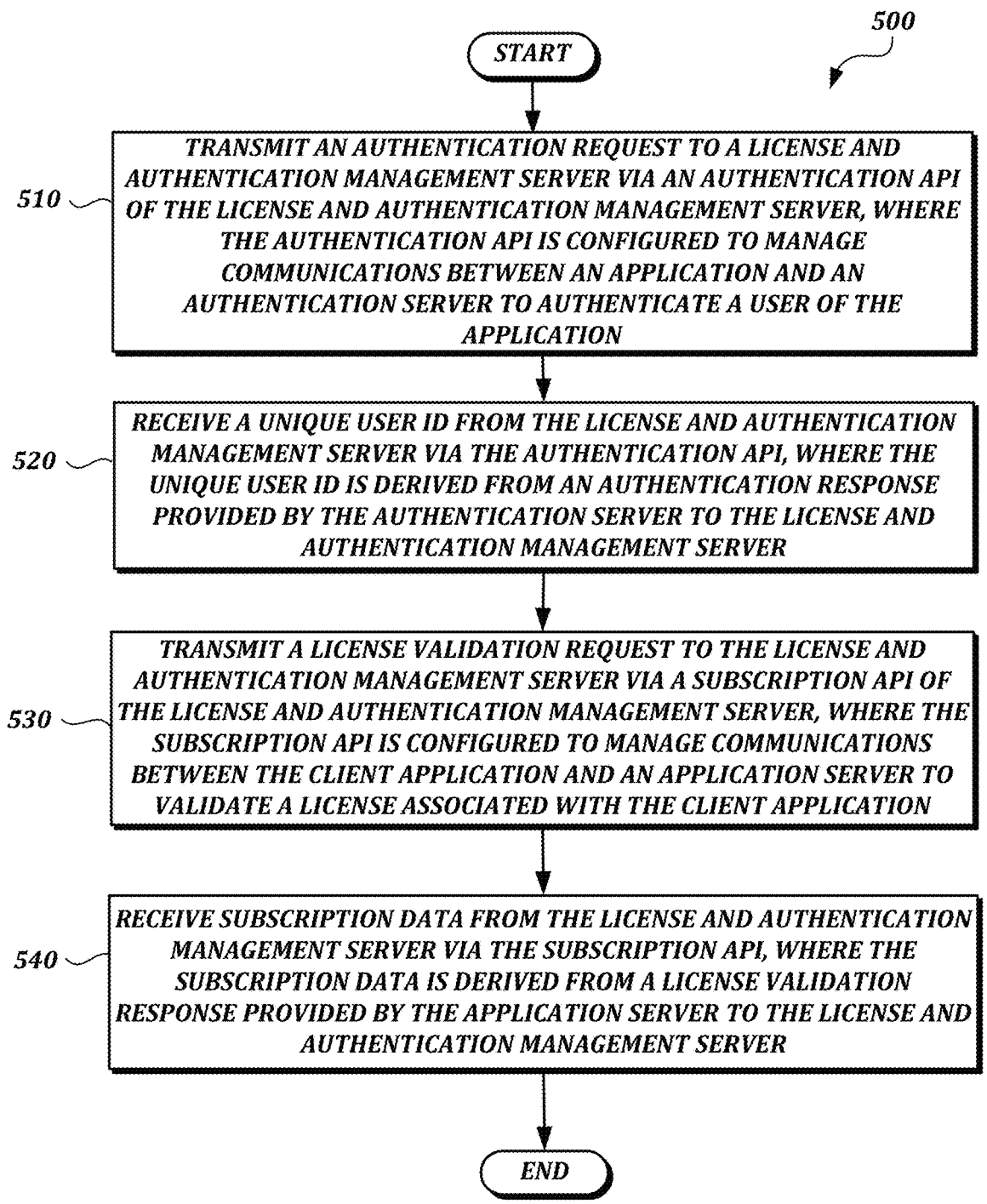
FIG. 5 is a flow diagram of an illustrative process in which a client device authenticates a user and validates a license for a client application executing on the client device using APIs provided by a license and authentication management server.

FIG. 5 is a flow diagram of an illustrative process 500 in which a client device (e.g., the client computing device 110 of FIG. 1B) authenticates a user and validates a license for a client application executing on the client device. At step 510, the client device transmits an authentication request to a license and authentication management server via an authentication API of the license and authentication management server. The authentication API is configured to manage communication between the client application and an authentication server (e.g., a server of an SSO identity provider) to authenticate a user of the client application. In an illustrative scenario, the authentication request is transmitted via an HTTP GET request that invokes the illustrative "authenticate" operation described above. The authentication request is for a user that has previously logged in (e.g., using techniques described above with reference to the illustrative embodiments) to a system that provides subscription-based services via the client application. At step 520, the client device receives a unique user ID (e.g., a base-64 encoded SAML assertion) from the license and authentication management server via the authentication API. The unique user ID is derived from an authentication response provided by the authentication server to the license and authentication management server.

At step 530, the client device transmits a license validation request to the license and authentication management server via a subscription API of the license and authentication management server. The subscription API is configured to manage communications between the client application and an application server to validate a license associated with the client application. In an illustrative scenario, the license validation request is transmitted by the client device via an HTTP POST request that invokes the illustrative "validateLicense" operation described above. The license validation request may include device and application data (e.g., a machine ID and a product ID). At step 540, the client device receives subscription data (e.g., a license status, either alone or in combination with other subscription data such as a polling period and a grace period) from the license and authentication management server via the subscription API. The subscription data is derived from an authentication response provided by the authentication server to the license and authentication management server.

Computing Environment

Embodiments described herein can be implemented by suitably programmed and configured computing devices, individually or in combination. The description below is applicable to computing devices such as servers, personal computers, mobile phones, smart phones, tablet computers, embedded computing devices, handwriting devices, and other currently available or yet to be developed devices that may be used in accordance with embodiments of the present disclosure.

In its most basic configuration, a computing device includes at least one processor and a system memory connected by a communication bus. Depending on the exact configuration and type of device, the system memory may be volatile or nonvolatile memory, such as read only memory ("ROM"), random access memory ("RAM"), EEPROM, flash memory, or other memory technology. Those of ordinary skill in the art and others will recognize that system memory typically stores data and/or program modules that are immediately accessible to and/or currently being operated on by the processor. In this regard, the processor may serve as a computational center of the computing device by supporting the execution of instructions.

The computing device may include a network interface comprising one or more components for communicating with other devices over a network. Embodiments of the present disclosure may access basic services that utilize a network interface to perform communications using common network protocols. The network interface may also include a wireless network interface configured to communicate via one or more wireless communication protocols, such as WiFi, 2G, 3G, 4G, LTE, WiMAX, Bluetooth, and/or the like.

The computing device also may include a storage medium. However, services may be accessed using a computing device that does not include means for persisting data to a local storage medium. Therefore, the storage medium is optional. In any event, the storage medium may be volatile or nonvolatile, removable or non-removable, implemented using any technology capable of storing information such as, but not limited to, a hard drive, solid state drive, CD-ROM, DVD, or other disk storage, magnetic tape, magnetic disk storage, and/or the like.

As used herein, the term "computer readable medium" includes volatile and nonvolatile and removable and non-removable media implemented in any method or technology capable of storing information, such as computer readable instructions, data structures, program modules, or other data. In this regard, system memory and storage media are examples of computer readable media.

For ease of illustration and because it is not important for an understanding of the claimed subject matter, the figures do not show some of the typical components of many computing devices. In this regard, a computing device may include input devices, such as a keyboard, keypad, mouse, trackball, microphone, video camera, touchpad, touchscreen, stylus, and/or the like. Such input devices may be coupled to the computing device by wired or wireless connections including RF, infrared, serial, parallel, Bluetooth, USB, or other suitable connection protocols using wireless or physical connections.

In any of the described examples, data can be captured by input devices (e.g., signature devices) and transmitted or stored for future processing. The processing may include encoding data, which can be subsequently decoded for presentation by output devices. Input devices can be separate from and communicatively coupled to a computing device, or can be integral components of the computing device. The computing device may also include output devices such as a display or touchscreen. The output devices can be separate from and communicatively coupled to the computing device, or can be integral components of the computing device. Input functionality and output functionality may be integrated into the same input/output device (e.g., a touchscreen). Any suitable input device, output device, or combined input/output device either currently known or developed in the future may be used with described systems.

In general, functionality of computing devices described herein may be implemented in computing logic embodied in hardware or software instructions, which can be written in a programming language, such as C, C++, COBOL, JAVA™ PHP, Perl, Python, Ruby, HTML, CSS, JavaScript, VBScript, ASPX, Microsoft .NET™ languages such as C #, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

EXTENSIONS AND ALTERNATIVES

The examples described herein can be extended to include use cases other than user authentication or validation of licenses, such as provision of usage metrics. Such usage metrics may be useful for tasks such as billing for digital ink services that may be provided with client applications for signature devices. In one illustrative scenario, a signature application communicates to a server for the purposes of a license check on the signature application. If the license is valid, the client application may report a usage metric back to the server (e.g., indicating that a user has used the signature device to create three signatures on a document or on multiple documents). This usage metric can then be communicated to a billing server that could then invoice a customer at the end of each month, based on their usage of the particular product.

As another example, the examples described herein can be extended to include provision of additional information such as a digital certificate. In one illustrative scenario, a a license and authentication management server provides, in the case of a user having a valid subscription, a digital certificate that the client application may use as part of a digital signing process, or to encrypt signature data on the device. The certificate may be provided as part of a "license valid" response, as described above with reference to the validateLicense operation in a subscription API. In this scenario, the certificate may be the public key portion of a private/public key pair, and the private key may be stored on a secure server, such as where signature data is required to be decrypted. As a further extension, the digital certificate feature may be combined with digital ink billing, such as by billing (e.g., on a monthly basis) per user or per key-pair held on the secure server.

A license and authentication management server may provide such operations in a subscription API described herein, or in some other way. As with other functionality described herein, this approach permits the client application to be programmed in a more lightweight fashion, omitting specialized code for communicating directly with servers for the purpose of providing or obtaining additional information, such as usage metrics for digital ink billing or other services, or digital certificates. In practice, this arrangement not only allows a provider of the license and authentication management server to more easily provide a wide variety of client applications, but also allows third party software vendors to more easily provide their own client applications.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

In this description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

While illustrative embodiments have been illustrated and described, it will be appreciated that various changes can be made therein without departing from the spirit and scope of the invention.

The embodiments of the invention in which an exclusive property or privilege is claimed are defined as follows:

1. A server computer system that provides license and authentication management services, the server computer system comprising one or more processors, a network interface, and computer-readable media comprising:
   an authentication API configured to manage communications between a client application executing on a client computing device and an authentication server to authenticate a user of the client application, wherein the client application is configured to generate electronic handwriting based on user input;
   a subscription API configured to manage communications between the client application and an application server to validate a license for digital ink functionality used by the client application to generate the electronic handwriting; and
   computer-readable instructions configured to cause the server computer system to:
      receive an authentication request from the client application via the authentication API;
      transmit the authentication request to the authentication server via the authentication API;
      receive an authentication response from the authentication server via the authentication API in response to the authentication request;
      transmit a unique user ID to the client application via the authentication API, wherein the unique user ID is derived from the authentication response;
      receive a license validation request via the subscription API from the client application;
      transmit the license validation request to the application server via the subscription API;
      receive a license validation response from the application server via the subscription API, wherein the license validation response includes subscription data; and
      transmit the subscription data to the client application via the subscription API.

2. The server computer system of claim 1, wherein the authentication request is for a user that has previously logged in using an account ID.

3. The server computer system of claim 1, wherein the authentication response includes a SAML assertion.

4. The server computer system of claim 3, wherein the unique user ID derived from the authentication response comprises a base-64 encoded version of the SAML assertion.

5. The server computer system of claim 1, wherein the license validation request comprises a machine ID and a product ID.

6. The server computer system of claim 1, wherein the subscription data comprises a license status.

7. The server computer system of claim 6, wherein the subscription data further comprises at least one of a polling period and a grace period.

8. The server computer system of claim 1, wherein the client application is a signature application.

9. A client computing device that accesses license and authentication management services provided by a server computer system, the client computing device comprising one or more processors, a network interface, and computer-readable media comprising computer-readable instructions configured to cause the client computing device to:
   transmit an authentication request to a license and authentication management server via an authentication API provided by the license and authentication management server, wherein the authentication API is configured to manage communications between a client application configured to generate electronic handwriting based on user input and an authentication server to authenticate a user of the client application;
   receive a unique user ID from the license and authentication management server via the authentication API, wherein the unique user ID is derived from an authentication response provided by the authentication server to the license and authentication management server in response to the authentication request;
   transmit a license validation request to the license and authentication management server via a subscription API provided by the license and authentication management server, wherein the subscription API is configured to manage communications between the client application and an application server to validate a license for digital ink functionality used by the client application to generate the electronic handwriting; and
   receive subscription data from the license and authentication management server via the subscription API, wherein the subscription data is derived from a license validation response provided by the application server to the license and authentication management server in response to the license validation request.

10. The client computing device of claim 9, wherein the authentication request is for a user that has previously logged in using an account ID.

11. The client computing device of claim 9, wherein the authentication response includes a single-sign-on unique user ID.

12. The client computing device of claim 9, wherein the license validation request comprises a machine ID and a product ID.

13. The client computing device of claim 9, wherein the subscription data comprises a license status.

14. The client computing device of claim 9, wherein the client application is a signature application.

15. The client computing device of claim 9, wherein the client device is in communication with a signature device that receives the user input on which the electronic handwriting is based.

16. A server computer system that provides license and authentication management services, the server computer system comprising one or more processors, a network interface, and computer-readable media comprising:
   an authentication API configured to manage communications between a signature application executing on a client computing device and a single-sign-on authentication server to authenticate a user of the signature application, wherein the client computing device is in communication with a signature device;
   a subscription API configured to manage communications between the signature application and an application marketplace server to validate a license for functionality used by the signature application to embed digital ink data in an electronic document; and
   computer-readable instructions configured to cause the server computer system to:

receive an authentication request from the signature application via the authentication API;

transmit the authentication request to the single-sign-on authentication server via the authentication API;

receive an authentication response from the single-sign-on authentication server via the authentication API in response to the authentication request;

transmit a unique user ID to the signature application via the authentication API, wherein the unique user ID is derived from the authentication response;

receive a license validation request via the subscription API from the signature application;

transmit the license validation request to the application marketplace server via the subscription API;

receive a license validation response from the application marketplace server via the subscription API, wherein the license validation response includes subscription data; and transmit the subscription data to the signature application via the subscription API.

17. The server computer system of claim 16, wherein the authentication response includes a SAML assertion.

18. The server computer system of claim 17, wherein the unique user ID derived from the authentication response comprises a base-64 encoded version of the SAML assertion.

19. The server computer system of claim 16, wherein the authentication request is for a user that has previously logged in using an account ID.

20. The server computer system of claim 16, wherein the subscription data comprises a license status and at least one of a polling period and a grace period.

* * * * *